Oct. 30, 1956 H. M. WEIR 2,768,947

GAS PHASE ARC CONVERSION

Filed March 13, 1952 5 Sheets-Sheet 1

INVENTOR.
HORACE M. WEIR

BY Joseph Rossman

ATTORNEY

INVENTOR.
HORACE M. WEIR
BY Joseph Rossman
ATTORNEY

Oct. 30, 1956 H. M. WEIR 2,768,947

GAS PHASE ARC CONVERSION

Filed March 13, 1952 5 Sheets-Sheet 3

INVENTOR.
HORACE M. WEIR
BY
Joseph Rossman
ATTORNEY

Oct. 30, 1956

H. M. WEIR 2,768,947

GAS PHASE ARC CONVERSION

Filed March 13, 1952

5 Sheets-Sheet 4

INVENTOR.
HORACE M. WEIR

BY Joseph Rossman

ATTORNEY

Oct. 30, 1956 H. M. WEIR 2,768,947

GAS PHASE ARC CONVERSION

Filed March 13, 1952 5 Sheets-Sheet 5

INVENTOR.
HORACE M. WEIR
BY

ATTORNEY

United States Patent Office 2,768,947

Patented Oct. 30, 1956

2,768,947

GAS PHASE ARC CONVERSION

Horace M. Weir, Merion, Pa.

Application March 13, 1952, Serial No. 276,371

7 Claims. (Cl. 204—156)

This invention relates to the controlled positioning and controlled oscillation in space of electric arcs utilized for the conversion of gaseous chemical compounds to other chemicals and in particular to the arrangement of arcs and environment which I employ in my gas conversion process which is the subject of co-pending application Serial No. 213,205, of which I am the inventor.

In order to more exactly describe the improvement in apparatus which is the subject of this specification, I first review briefly the nature of the process described in detail in co-pending application No. 213,205, and thereafter I describe the new improvements. For the purposes of review, I refer hereinafter to the following figures, Figures 1, 2 and 3 being substantially identical with figures appearing in the application Serial No. 213,205.

Figures 1, 2:
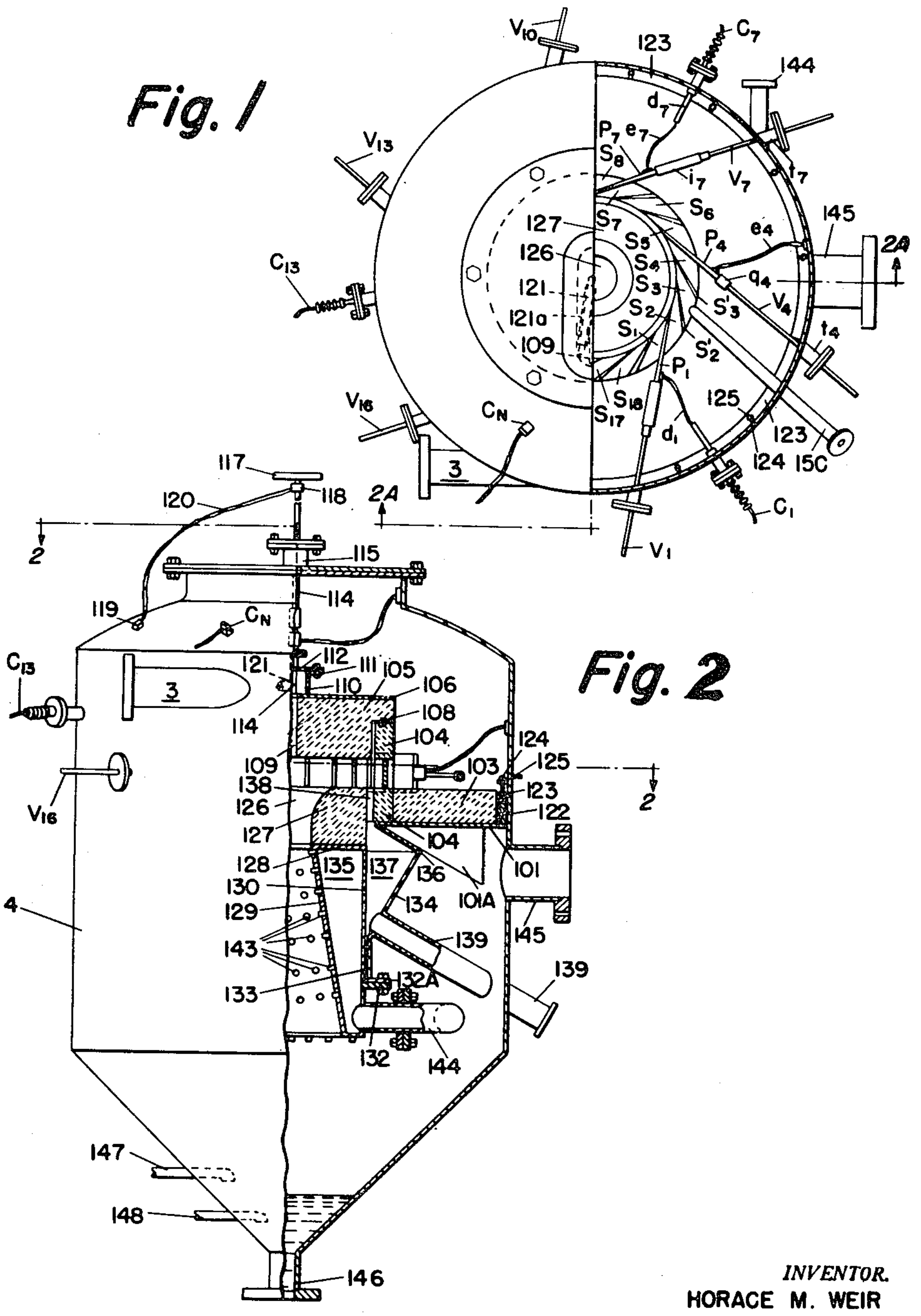
Figures 3, 3A:
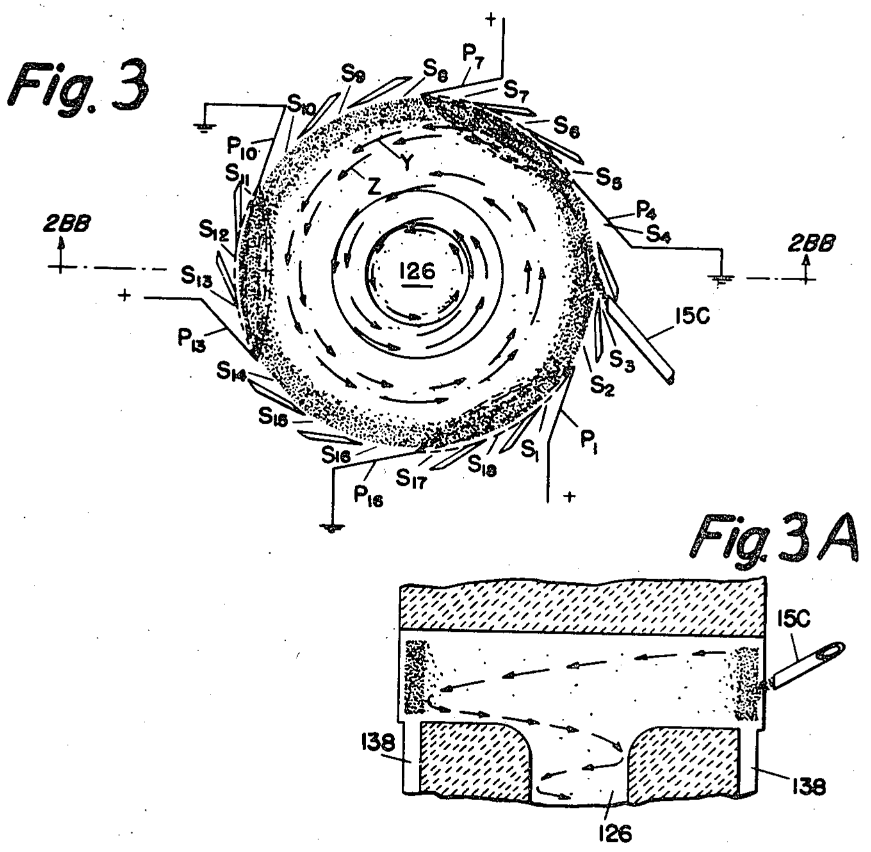

Figure 1—Plan view of gas conversion chamber;

Figure 2—Elevation showing gas conversion chamber and appended temperature lowering or "quench" volume;

Figure 3—Diagrammatic plan view of gas conversion chamber in operation;

Figure 3*a*—Elevation of gas conversion chamber.

Figure 4A:
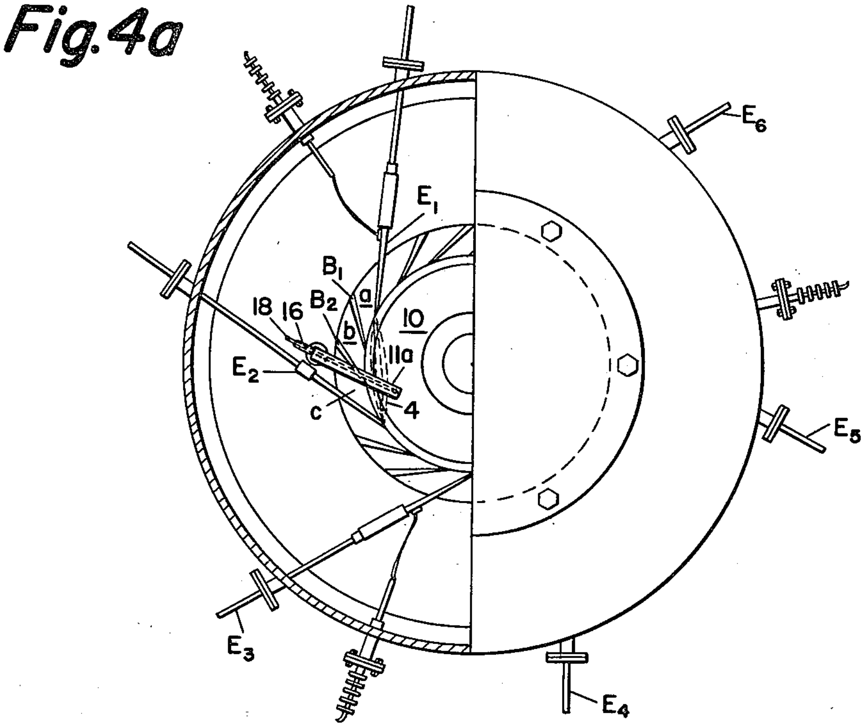
Figure 4B:
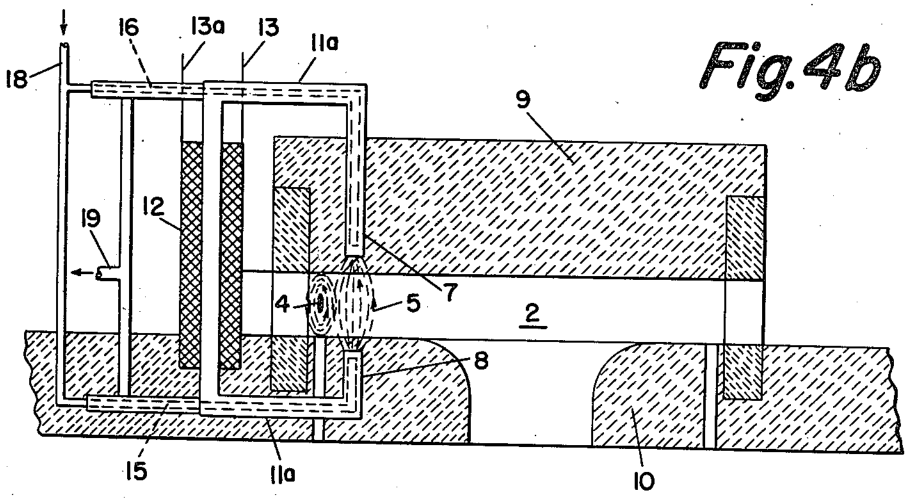
Figures 5A, 5B:
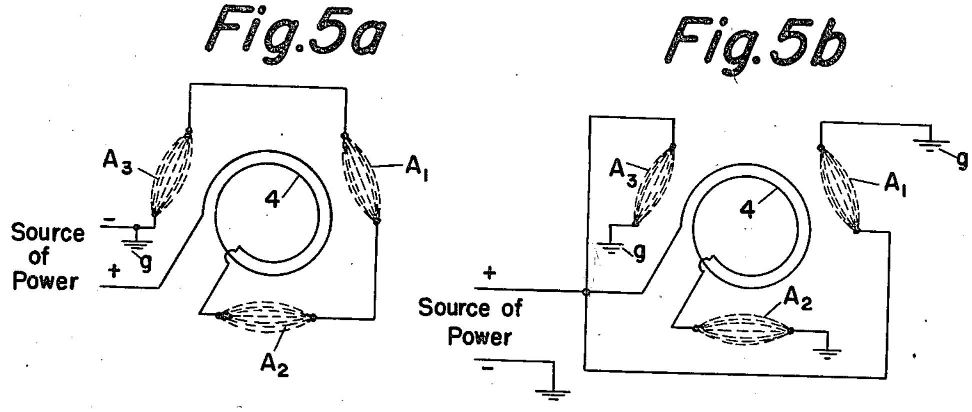
Figure 5C:
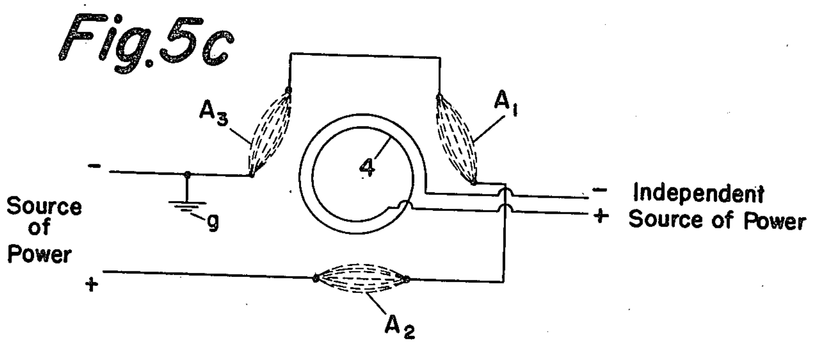
Figure 6:
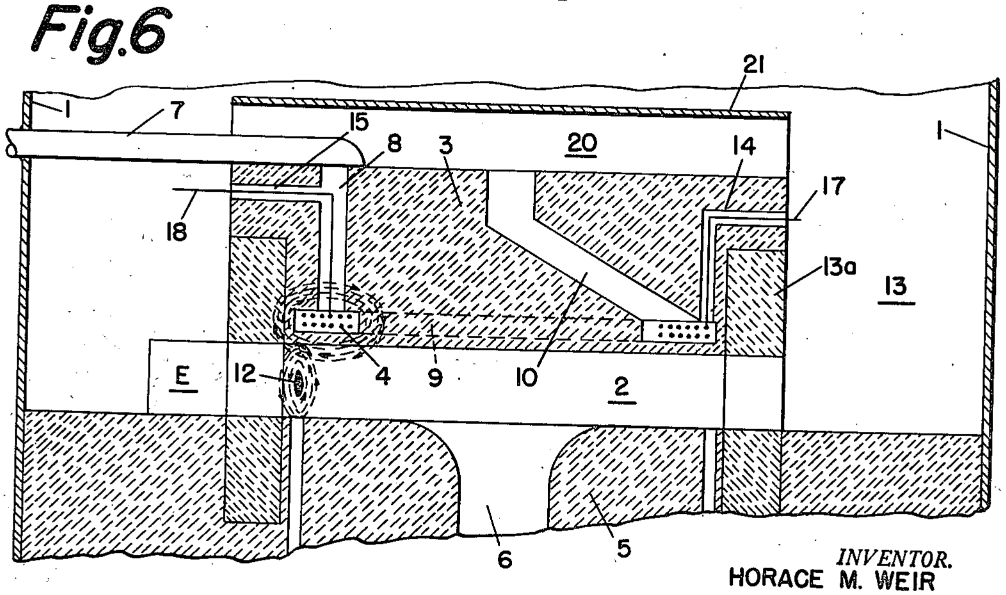
Figure 7A:
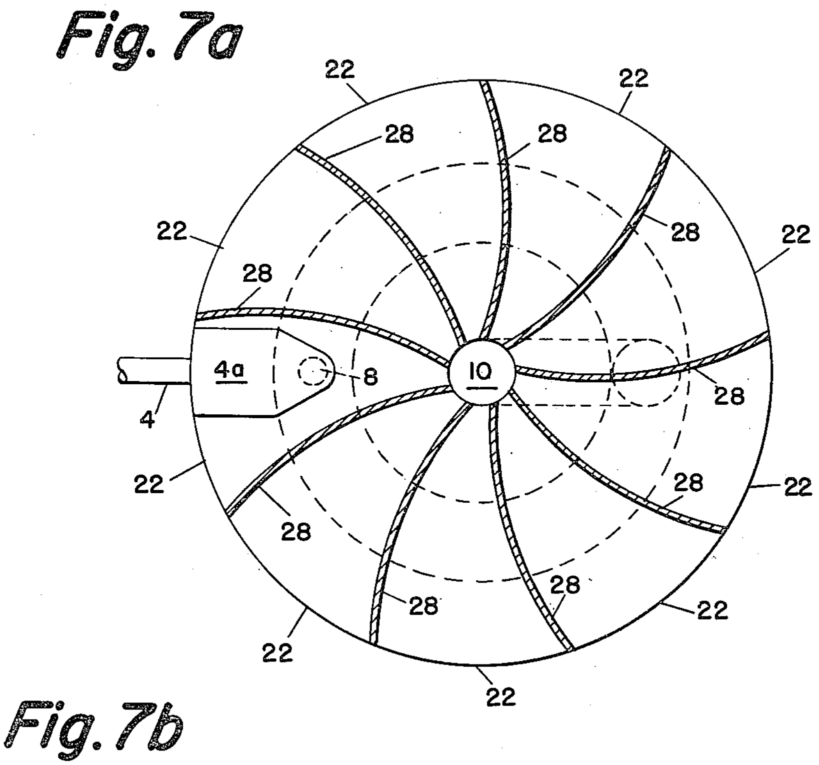
Figure 7B:
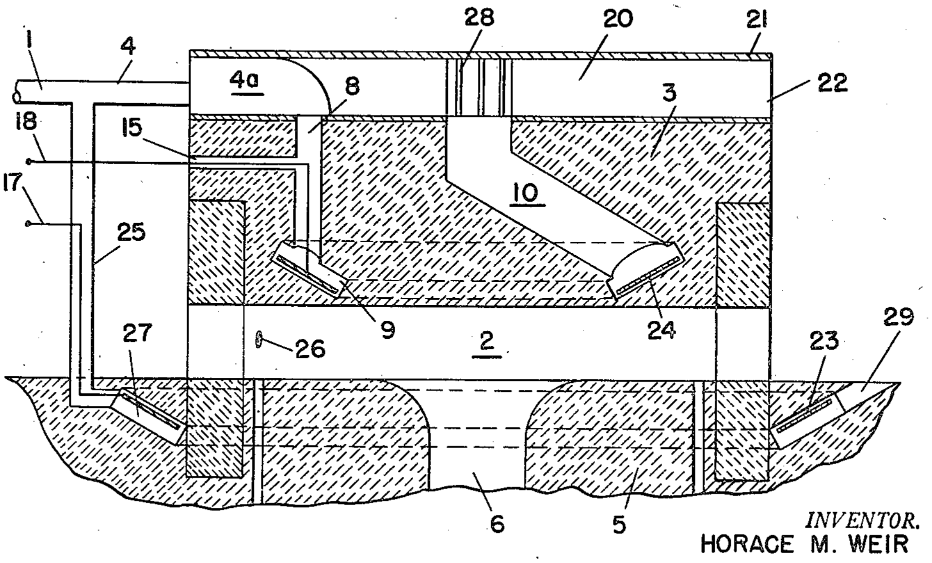

In addition, the following figures relate to this invention:

Figs. 4*a* and 4*b*—Plan and elevation showing application of one means of control (magnetic field);

Figs. 5*a*, 5*b* and 5*c*—Electrical circuits for a second mode of control (magnetic field);

Fig. 6—Elevation showing application of the second means of control (magnetic field);

Figs. 7*a* and 7*b*—Plan and elevation of a third control means (electrostatic field).

In the operation of my process, described more in detail in Serial No. 213,205, I may use an embodiment of my process such as is illustrated in Figures 1 and 2, being respectively a plan view of the upper portion of my gas converter 4 and an elevation of the entire assembly. The upper portion comprises the means to conduct feed gas through multiple orifices $S_1$ to $S_8$, inclusive, and $S_{17}$ and $S_{18}$ and similar orifices arranged around the entire periphery of the reaction chamber, together with the reaction chamber itself. This latter is the volume of short cylindrical form enclosed by the refractory collar, or cylinder wall, 104, containing the aforementioned orifices, top closure piece 105, and bottom closure piece 127, with concentric outlet channel 126, which leads the product gases into the water injection or quench chamber below. Pairs of electrodes $P_4$ and $P_7$, $P_{10}$ and $P_{13}$, and $P_{16}$ and $P_1$, are spaced around the reaction chamber and serve to position three electric arcs in the reaction chamber and in the gas circulating therein. Each of the electrode pairs in this embodiment (which provides for parallel connection of the arcs with the source of power) have one grounded electrode, namely, $P_4$ or $P_{10}$ or $P_{16}$, and corresponding high potential electrodes $P_7$ or $P_{13}$ or $P_1$. The connections to the steel shell of vessel 4, which itself is connected to ground by means of a ground connection to $C_N$ are similar to the single conductor, $e_4$, shown bonding electrode $P_4$ to the shell. The high potential connections, $d_1$ and $d_7$ to $P_1$ and $P_7$, pass through suitable porcelain insulators and terminate in conductors $C_1$ and $C_7$, respectively.

The remaining high potential connection to $P_{13}$ is not fully shown, but is entirely similar. The terminating conductor $C_{13}$ is shown, however. The terminating conductors $C_1$, $C_7$ and $C_{13}$ are connected to one lead to a source of direct current potential. A lead to ground and firmly attached to vessel 4 completes the circuit when the arcs operate.

To initiate the arcs, a movable electrode 121, connected to ground shell, 4, by conductor 120 and lug 118 and 119 is introduced into the reaction chamber from its position of rest in gas-tight pocket 110 through radial slot 109. Manual rotation of wheel 117, connected to shaft 114, through stuffing box 115, is continued through a sufficient sweep angle to pass close by all electrode pairs. In passing close by the interior end of $P_1$, a short arc is automatically established between this electrode and the bare end of 121, and the arc drawn out until the rotation of radial electrode 121 carries it well past electrode $P_4$. The arc automatically transfers from 121 to $P_4$, since the path between $P_1$ and $P_4$ becomes one of lesser resistance than the path between 121 and $P_1$. The other two arcs are established by similar slow rotation of 121, past the corresponding electrode pair, after which the auxiliary movable electrode is returned to its position of rest, **121*a*, in pocket 110**, where it remains out of service until needed again to establish or reestablish the arcs. Normally the arcs burn continuously between the electrode pairs over extended periods and serve their purpose of furnishing the energy for gas conversion.

In normal operation, the selected feed gas phase for conversion may be natural gas essentially composed of methane, or a hydrocarbon mixture containing molecules with one to four, or even higher number of carbon atoms. Such mixtures are readily converted to mixtures containing some of the original hydrocarbons, together with other paraffinic and olefinic hydrocarbons and hydrogen and acetylene. If I wish to produce hydrocyanic acid, I introduce nitrogen or preferably ammonia in admixture with natural gas or mixtures of higher hydrocarbons. The resultant product gas mixture contains hydrocyanic acid and hydrogen, together with residual nitrogen or ammonia and hydrocarbons, including in typical cases at least traces of acetylene.

The modus operandi of gas conversion by the embodiment of my invention already partially described, is as follows: The selected feed gas under suitable positive pressure is injected through pipe 3 and circulates in the annulus exterior to the refractory closure piece 105, attached to cover plate 106, which refractory rests on and makes a gas-tight closure with refractory cylinder 104 by means of packing 108. The circulating gas is also confined by refractory floor 103, and the walls of vessel 4. The gas enters the reaction chamber through the aforementioned orifices in refractory cylinder 104 and passes through or close by one or more of the arcs in vortex motion occasioned by the angularity of the orifice passages $S_1$ and $S_8$ and similar orifices spaced around the periphery. Solids in suitable subdivision for suspension in the gas phase are substantially continuously introduced through pipe **15*c*** and are caught up by the ingressing gas through slot $S_3$. The solids may be refractory particles or may be particles made from a material selected from the group which consists of coke, charcoal, anthracite or bituminous coal. Said particles are preferably in a narrow range of sizes between the limits of 20–300 mesh.

The solids tend to equilibrate in suspension in the vortex flow of the gas under the influence of centrifugal force opposing the frictional drag of the gas passing to the concentric gas outlet 10. Thus, in operation, a concentration of particles is in suspension in the gas phase and in rotation near the periphery of the reaction chamber, which concentration is in the form of a ribbon or band. I have termed this the "solid cloud band," or more simply the "cloud band" of my apparatus. The arcs tend to operate within the volume marked out by the cloud band and same serves to modulate the temperature attained by the gas in the arc by reason of the heat capacity of the solids. Figures 3 and 3*a* diagram the conditions within the reaction chamber. The letter S with numeral subscripts indicate the multiple gas orifices $S_1$ to $S_{18}$. $P_1$, $P_4$, $P_7$, $P_{10}$, $P_{13}$ and $P_{16}$ are the electrodes and dashed lines in the midst of the cloud indicate the three arcs. The spiral traces, Y to Z, indicate the nature of the path of the gas from the orifices to the central outlet 126. The cloud band in the apparatus is shown by a myriad of dots representing the particles which equilibriate under the influence of centrifugal force, tending to throw the particles toward the gas orifices $S_1$ to $S_{18}$ and the friction drag of the gas vortex, tending to carry the particles to outlet pipe 126. The section of the apparatus taken at plane 2BB is indicated in Fig. 3*a*. Pipe 15C, for delivery of finely-divided solids, is shown, but for simplicity, the orifices for gas-flow are omitted, as are the electrodes and the arcs. A small section of the cloud band is shown by dots. Aside from outlet pipe 126, one notes the annular orifice 138, which serves to discharge from the reaction chamber the occasional particle which drops out of the cloud band and which is not immediately re-suspended in the gas. Further mention of this annular orifice will be made in connection with Fig. 2.

Returning now to description of the process with the aid of Figure 2, it will be obvious that after the gas passes through the arcs and through the cloud band of particles in vortex motion, it spirals toward and through centrally disposed gas outlet 126, in the refractory floor 127 of the reaction chamber. Attached to plate 126, which supports refractory 127, is water jacket 135, fitted with a multiplicity of water spray nozzles 143. A source of cooling water is attached to pipe 144 and water is continuously forced through pipe 144, into jacket 135, and through the spray nozzles. Substantially, all of the water spray flash evaporates to reduce the temperature of the flowing gas in the conical channel without removal of heat. The amount of water is adjusted to reduce the temperature below that of substantial further chemical reaction—particularly the decomposition reaction which reduces the yield of acetylene, or hydrocyanic acid if I propose to manufacture the latter compound. Water jacket 135 fits into and forms one wall of chamber 137, which serves to receive solid particles which may drop out of the cloud band of my apparatus and fall through annular orifice 138. The particles are discharged from chamber 137, through pipe 139, which leads into a suitable pressure hopper (not shown), or into one of a pair of vessels (not shown), which may be alternately put under pressure and serve to receive the solids prior to disposal. Flange 132 on water jacket 135 and flange 132A register and make the chamber 137 gas-tight. As a matter of convenience, I usually make chamber 137 with side walls in the shape of frustums of cones, indicated by 134 and 136. The wall 136 is conveniently attached to bracket 101A, adapted to support the weight of refractories and other apparatus in the upper chamber.

The product gas and evaporated water, which flows continuously from the conical quenching zone, emerges from vessel 4, through gas pipe 145. The product gas carries suspended carbon black—a product of the reaction, and/or particles of solid originally introduced through pipe 15C and which formed part of the cloud band for a specific length of time. A portion of these solids particles may drop out of suspension in the gas. I usually maintain a level of water in the conical bottom of vessel 4 by means of a differential liquid level control actuated by pressure differences transmitted to it through pipes 147 and 148. The controller is not shown, nor is the discharge pipe and the controlled valve, which I connect to nozzle 146 at the base of the vessel. The source of the water in the conical base of vessel 4 may be unevaporated water from the spray jets 143, or I may provide separate means for water injection (not shown).

In order to provide for differential expansion of the refractories in the upper part of vessel 4, I usually provide peripheral packing 122 and hold down plates 123, together with threaded lugs 125 and bolts 124, all spaced about the inner periphery of the chamber.

While I have described in detail one embodiment of my invention, it is obvious that I may employ many different combinations of elements. In particular, I may employ more or less than three arcs in my reaction chamber.

In the preceding paragraphs, I have briefly outlined the invention described and claimed in Serial No. 213,205. My present invention may be utilized as an improvement thereon. Accordingly, I will now describe its operation as applied to said previous invention. Nevertheless, I am not limited to application of this new invention to the former one. It will be understood by those acquainted in the art that, by suitable modification, the principles may be applied to other forms of process, involving chemical conversions by means of the electric arc.

It will be obvious that if I employ electric current conducting particles, such as particles of coke, in my cloud band, the arcs will tend to follow a path entirely inside the band of particles by reason of the fact that this tends to be the path of least resistance between the two electrodes. Nevertheless, the component of gas motion toward the axis of the vessel tends to blow the arc toward the center. Part of the arc path may be inside the cloud band of particles. This tendency is usually more pronounced when I employ refractory particles in place of better conducting particles.

There is another effect tending to displace at least part of the arc toward the axis of the converter. This effect exists irrespective of the nature of the particles employed. It may be noted that the direction of direct current flow through the arc is opposite to the general direction of current flow in the electrodes, $P_1$, $P_7$ and $P_{13}$. In operation the magnetic fields around the above-mentioned electrodes and around the path of the arcs react and tend to force the arcs away from each of these electrodes. Under certain conditions this may be advantageous, as it tends to make the arc follow the rotating cloud band, but if the magnetic effect is larger than corresponds to this ideal condition, these portions of the arcs in the vicinity of the above-mentioned electrodes may be forced far enough in the general direction of the axis of the reactor to cause them to partly emerge from the cloud band.

The above-mentioned effects of the magnetic fields are only exerted by the above-mentioned electrodes. The fields about electrodes $P_4$, $P_{10}$ and $P_{16}$ are substantially about the same axes as the fields set up by the respective arcs and are without substantial influence on the arcs. Hereinafter, in referring to any electrode pair which serves for an arc, I may refer to the electrode which is substantially in line with the arc as the "parallel" electrode and that electrode which is at an acute angle with the line joining the ends of the two electrodes as the "acute" electrode.

Having now described two factors which may tend to displace a portion of any given one of the arcs toward the axis of the reactor, namely, the velocity component of gas motion toward the center, and the magnetic field reaction between the arc and the acute electrode, I will now describe my newly invented means to regulate the position of the arc when my apparatus is in operation. One means which I have found to be effective is to provide a magnetic field of such direction as to oppose the tendency of the arc to move under the action of gas motion and electrode fields.

In Figs. 4*a* and 4*b*, I illustrate one construction which I may employ. Fig. 4*a* is a plan view. Fig. 4*b* is the elevation of a cross section of part of the reaction chamber 2, showing electrodes $E_1$ and $E_2$ for one of the three arcs. Part of electrode $E_3$ is indicated in Fig. 4*b*, but the other electrodes $E_4$, $E_5$ and $E_6$ are indicated only by the outer ends thereof. It will be understood that, in operation, arcs are established and maintained between the inner ends of each of the three pairs of electrodes, and that the flow of gas is through slots *a*, *b* and *c*, and corresponding slots (not shown) in the vicinity of the other two pairs of arcs $E_3E_4$ and $E_5E_6$. Vanes such as $B_1$ and $B_2$, preferably made of refractory, direct the gas at a very acute angle with the tangent of the inner periphery of the reaction chamber, 20. Dotted line 4 indicates the geometric locus of the arc between electrodes $E_1$ and $E_2$. In operation the arc tends to depart from this straight line, 4, curving more or less concentric with the inner periphery of the reaction chamber and tending to be forced into a position nearer the axis of the chamber by reason of the gas flow and the magnetic field reaction between acute electrode $E_2$ and the arc, as already ascertained. To counteract this tendency and to force the arc to assume the position I desire, in which it is substantially completely enveloped in the cloud band of solid particles, I may provide an electromagnet (see Fig. 4*b*), preferably having a paramagnetic core 11*a*, in the form of a letter C, with the central axis of air gap 5 at a lesser distance from the central axis of the chamber than the geometric trace, 4, of the arc. Pole pieces 7 and 8 of the electromagnet are preferably imbedded in refractory top, 9, and bottom, 10, of the chamber respectively. Refractories shown in Fig. 2, attached to plate 106, and number 127, correspond to 9 and 10, respectively, in Fig. 4*b*. I preferably make core, 11*a*, of soft iron steel and build same in laminated form, but I may use other paramagnetic metals or alloys either in laminated or solid form. A solenoid or coil of electric conducting wire 12 is provided to establish a magnetic field between the pole pieces. If the positive terminal of the arc is $E_1$, which is preferable, then the direction of the magnetic field about the arc is conventionally counter-clockwise, as shown in Fig. 4*b*. In this event, I connect the solenoid terminals 13 and 13*a* to an adjustable source of direct current such that pole piece 7 becomes a south pole and the conventional direction of the magnetic field in the air gap 5 is upward, as shown by arrows. The two magnetic fields thus interact and tend to force the arc away from the axis of the air gap and hence to a position nearer the electrode $E_2$ and the inner periphery of the chamber. I regulate the strength of the electric field by adjusting the current flow through solenoid 12 by known means, not shown, and am thus able to force the arc to assume the position I choose, under the equilibrium of forces of the three magnetic fields (due to electrode $E_2$, the arc and the auxiliary field in the air gap of the auxiliary electromagnet). To avoid overheating and substantial loss of paramagnetism of the pole pieces, 7 and 8, under the high ambient temperature which the surrounding refractory takes up in continuous operation, I usually provide for water cooling of both pole pieces. I usually drill axial holes through the paramagnetic metal members, 11*a*, so that water pipes, 15 and 16, may be inserted and terminated very near the end of the pole pieces forming the air gap. With water inlet pipe 18 connected to pipes, 15 and 16, I cause water to flow inside the last-named pipes and to return through the respective annuli in the limbs to a manifold pipe having outlet pipe 19. Pipe 18 is connected to a supply of water, preferably cold water, and pipe 19 is connected to a suitable discharge for waste water. By adjustment of the flow of water by known means, I maintain the poles of the electromagnet preferably well below the transition temperature of the metal at all times. If I use iron or steel for my paramagnetic core, this being a preferred type of core, I adjust the water flow to maintain a temperature preferably less than 350° C.

While methods are well known by which the strength of simple magnetic fields may be calculated, it will be obvious in an apparatus of the character I utilize there are many interacting fields, the intensity of which varies with temperature as well as the geometry of the apparatus. It is usually necessary to experiment to determine the current strength in amperes which, together with the number of turns of wire in coil 12, suffice to regulate the position of the arc to the degree which is desired. Effective regulation may probably be secured in most cases when the magnetic field intensity in the air gap between the pole pieces is of the order of 2000–350 lines of magnetic flux, adjustable to lesser values per square centimeter of area of air gap between the pole pieces by reduction of the current flowing through the solenoid.

I am, however, not limited as to the maximum intensity of the magnetic field which I employ, or the degree of modulation thereof, which I may achieve by providing for regulation of the current through the actuating solenoid, but am free to use the particular field strength and modulation which best serves my purpose of positioning the arc.

While I have shown only one arc and regulating means in Fig. 4*a* and 4*b*, it will be understood that I commonly employ said regulating means on each of the arcs which I employ for my reaction chamber.

It is obvious that the principle which I employ to position the arcs in my gas conversion means in order to obtain maximum efficiency of said conversion is to oppose the tendency of the arc to wander by suitable magnetic fields. These magnetic fields may be established by numerous different arrangements of the electromagnets, causing same, and I am free to use such other arrangement as will effect my purposes, being in no wise limited by the particular physical arrangement illustrated by Fig. 4*a* and 4*b*. While I prefer in all cases to arrange the magnetic field to repel the arc, it is also possible to position the poles of the magnet so that the field caused thereby is at a greater distance from the axis of the chamber than the average position of the arc. In this case the polarity of the magnet must be arranged to attract the arc rather than repel it. If, for example, I employ an electromagnet similar to that shown in Fig. 4*b*, but having an air gap 5 to the left of the trace of the arc 4 (rather than to the right as in Fig. 4*b*), I make connection with terminals 13 and 13*a* of the solenoid such that the pole piece 7 becomes a north pole rather than a south pole, as is the case when the pole piece is as shown in Fig. 4*b*.

While the arrangement just described is within the scope of my invention, I usually prefer the arrangement corresponding to Fig. 4*b*, since the operation is more stable. This will readily be understood since arrangement of the magnetic field in the airgap, as shown in Fig. 4*b*, provides for increasing field strength and hence repelling force as the arc is displaced towards the central axis, whereas if the magnetic field is one of attraction situated on the opposite side of the arc, displacement of the arc towards the center is motion into a region of gradually decreasing field strength.

Another entirely different form of my invention will now be described. Fig. 6 is an elevation of the reaction chamber of this embodiment of my invention taken along a diametrical plane. The reaction volume is indicated by 2, but for simplicity the circumferential slots and electrodes, which may be arranged similarly to same shown in Fig. 1 or Fig. 4*a*, are not shown. The normal trace of one of the arcs, 12, is shown as a dot, corresponding to a view directly in line with the axis of the arc. The distinguishing feature of this embodiment is the provision of an annular electromagnet, 4, situated in a hollow annulus or torus 9, formed in the refractory closure piece 3. The number of turns or coils of the conductor of coil 4 may be relatively few or many, as hereinafter discussed, but in the typical case cooling means must be provided because of the high ambient temperature of the refractory when the arcs in the reaction chamber are in operation. For this purpose, I find it advantageous to conduct a suitable proportion or all of the feed gas to the reactor through a pipe 7, into and through pipe 8 and through the two halves of the torus 9, where the coil is situated. The gas exit pipe is 10, which is advantageously diametrically opposite the inlet pipe 8. Pipe 10 leads to volume 20, closed at the top by plate 21, and provided with gas distribution plates or vanes to conduct the gas to the circumferential outlets of the volume 20, while imparting a circular motion to the gas. The vanes radiating from pipe 10 in Fig. 6 may be entirely similar to vanes 28, shown in Fig. 7*a*. The gas having served its cooling purpose and being preheated thereby is thus caused to swirl in the annulus about the reaction chamber (best seen in Fig. 4*a*), after which it enters the reaction chamber through the peripheral slots or ports to reaction chamber 2, which are not shown in Fig. 6 but which are entirely similar to the slots 1, 2 and 3 of Fig. 4*a*. It will be readily understood that the processed gas makes its exit from the reaction chamber through channel 6, formed in refractory base 5, Fig. 6.

Conduits for the electrical leads to coil 4 of Fig. 6 are conveniently provided by pipes 15 and 14, which surround conductors 18 and 17, respectively. Preferably these conduits are not closed by the conductors, but a relatively small amount of gas flows through said conduits continuously to the outside annulus. I thus secure cooling of the conductors 17 and 18 by the flowing gas. If I choose, I may use bare copper wire for coil 4 and provide means to keep the turns of wire separate, or I may provide refractory porcelain insulators, such as beads or short tubular forms, for coil 4 and conductors 17 and 18.

While I have described an advantageous method for using the feed gas to the conversion means as cooling medium for the coil 4, it is obvious that I might employ a stream of other fluid or a liquid such as water for the purpose of circulating the fluid in and out of the system in closed circulation and employing external cooling means to remove the heat picked up from the coil 4.

To operate this embodiment of my invention, I connect a source of direct current power to terminal wires, 17 and 18, of Fig. 6, whereby I set up a field about coil 4. Said field intersects the magnetic field about the arc and is directed to exert a repelling force on the arc, tending to make it take up a position nearer the periphery and lower in chamber 2 than it would otherwise assume.

I may use any selected one of at least three circuits for energizing coil 4 and thereby creating the magnetic field about the annular coil 4 which influence all arcs in my reaction chamber.

Connections adapted to my purpose are diagrammed in Fig. 5*a*, 5*b*, and 5*c*. In the event I elect to operate the arcs $A_1$, $A_2$, and $A_3$ in series, I may preferably use the circuit of Fig. 5*a*. If I elect to operate the arcs A, $A_2$ and $A_3$ in a parallel circuit arrangement, I preferably use the connection scheme diagrammed in Fig. 5*b*. In both schemes the current flows through one or more arcs, also passes through coil 4.

Irrespective of whether I utilize the series or parallel connections for the arcs, I may choose to energize the auxiliary electromagnet coil 4 with a power connection independent of the arc circuit as indicated in Fig. 5*c*. While I show in Fig. 5*c* arcs $A_1$, $A_2$ and $A_3$ are connected in series, it is obvious that I may also use a parallel connection for the arcs $A_1$, $A_2$ and $A_3$.

In all cases the connections to the direct current source of power (or sources in Fig. 5*c*) are such that the direction of current flow in coil 4 is opposite to that in each of the arcs. Thus the magnetic field about coil 4 tends to force each arc away from coil 4, namely, downward and outward as measured from the axis of the reaction volume 2. If I utilize the connection of Fig. 5*a* or Fig. 5*b*, I cannot regulate the strength of the field independent of the current passing through the arcs other than by providing more or less turns of coil 4, I usually find that from 1 to 30 turns suffice to give the desired magnetic fields when I use connections of Figs. 5*a* and 5*b*. If I use the independent circuit of Fig. 5*c* I usually employ many more turns for coil 4 and employ a circuit of substantially lower amperage, adjustable by variable resistance in the circuit, or by other known means. In this case I am able to alter the magnetic field at will and quite independent of the power expended in the arc.

It will be understood that while I have repeatedly referred to the use of three arcs in my reaction chamber I am not limited to the use of three arcs but may employ my means for each or any one of any number of arcs which I may choose to employ in my reaction chamber.

I have already described two different embodiments of my invention and their application to the purpose of counteracting any tendency of the arcs to wander from a position near the periphery of my reaction chamber which I may choose as the optimum position for the arc so far as a single locus or substantially fixed portion is concerned.

However I find it advantageous under certain combinations of variables including particle size distribution and the concentration of the particles in the gas phase to cause the arc(s) employed in my apparatus to take up an oscillatory motion in space. One primary purpose of suspending solids in the gas phase being treated and as described in application Serial No. 213,205 is to distribute the intense heat of the arc over a much larger volume of gas than is possible in the absence of the particles. At the same time I effect a reduction of the temperature rise or a modulation of the temperature in the immediate vicinity of the arc path due to the momentary absorption of energy by the particles reflecting their high specific heat. If I force the arc to move rapidly thru the cloud band of particles in an oscillatory motion I am able to cause energy absorption by a substantially greater number of particles in any given short period of time and thus increase the effectiveness of temperature distribution and modulation on that which would otherwise obtain.

I find I can utilize a modification of the means previously described to cause this desired oscillatory motion of an arc. If I provide means to rapidly make and break the direct current flow energizing the auxiliary solenoid shown in Figures 4*a* and 4*b* the arc will oscillate between two positions, one that which it assumes in the absence of a magnetic field, the other that which it assumes under the maximum force of the maximum field. It is well known that a lapse of time is necessary to establish or to diminish the maximum field intensity of an electromagnet and during these lapses of time the arc will assume intermediate positions between the two extremes. If I employ a separate direct current energizing circuit as in Fig. 5*c* for the electromagnet in the embodiment illustrated in Fig. 6, I can also provide means for making and breaking the circuit flow thru coil 4 in rapid succession and thus cause all the arcs around the periphery of my reactor to take up oscillatory motions. The means for making and breaking the circuit in either of my embodiments described heretofore may be any one of several suitable known arrangements such as a rotating commutator, preferably with a condenser in parallel in order to reduce sparking tendencies, or a snap switch with condenser in parallel which switch is actuated by the temperature attained by an expansion member. I may also use other means to make and break the circuit.

As an alternate to the making and breaking of a direct current energizing circuit I may employ single phase alternating current for energizing the solenoids such as are shown in Figs. 4*a*, 4*b* or Fig. 6. In this case I obtain greater amplitudes of oscillation since alternately a repelling and an attracting magnetic field is established. I usually prefer to use an embodiment of my invention similar to that illustrated by Fig. 6 when I employ alternating current since said embodiment does not possess an iron core, and the magnetic field reversal tends to be more rapid and effective. Obviously I must utilize a separate power source for coil 4 similar to the arrangement of Fig. 5*c* if I employ alternating current to energize coil 4. While I may use 25 to 60 cycle alternating current from conventional circuits for coil 4 I may also employ higher frequency alternating current ranging from 60 cycles sec. upwards to some limiting value, at present unknown, above which the arc does not respond effectively to the rapidly changing magnetic field.

I may utilize still another means for controlling the position of arcs employed in my gas conversion means. This means depends upon the establishment of an electrostatic rather than an electromagnetic field in the vicinity of each arc I wish to influence. I may utilize this means when I desire to displace the arc from its normal relatively fixed position between the electrodes to another position also relatively fixed in space. Nevertheless the means to be described are more particularly adapted to establishing an oscillatory motion of the arc.

Figs. 7*a* and *b* illustrate one embodiment of the means to be described. Fig. 7*b* like Fig. 6 is an elevation of the reaction chamber with reaction volume 2. Again for simplicity the circumferential slots and electrodes for the arcs in chamber 2 are not shown but it will be understood that same are similar to the arrangement of Fig. 1 or Fig. 4*a*. The normal trace of one of the arcs, 26, is shown as a dot corresponding to a view directly in line with the axis of this particular arc. The distinguishing feature of this embodiment of my means for controlling the position or arcs in my reaction chamber is the positioning of two auxiliary annular electrodes 24 and 23 preferably above and below, and respectively at radii less and greater, than the normal distance of the arc to be influenced as measured from the axis of the chamber. An electrostic field is established between these auxiliary electrodes when my control means is in operation. In order to keep these auxiliary electrodes at temperatures well below the melting point of the metal I employ for same it is advantageous to situate them in annular channels adapted to provide for a flow of gas at all times over and above the auxiliary electrodes.

Referring to Fig. 7*b* pipe 1 conducts all, or part, of the gas mixture to be processed which is gas divided into two streams. A portion flows thru pipe 4, thru pipe 8 in communication therewith by way of closed gas volume **4*a* and into and thru the two halves of the annular volume 9, same being pathways between gas inlet pipe 8 and outlet pipe 10 preferably diametrically opposite to pipe 8. The gas flowing out thru pipe 10 in refractory closure piece 3 emerges into gas distributing volume 20 closed at the top by plate 21 and provided with gas distribution vanes 28 to conduct the gas to peripheral outlets 22 while imparting a motion about the gas about the axis of reaction chamber 2**. The gas is thus caused to swirl about in the annular gas volume about the reaction chamber (best seen in Fig. 4*a*) after which it enters the reaction chamber thru peripheral slots or ports to the reaction chamber 2 which are not shown in Fig. 7 but which may be entirely similar to the slots 1, 2 and 3 of Fig. 4*a*.

Returning now to the flow of the second portion of the gas entering thru pipe 1. Same flows thru pipe 25 and into annular volume 27 formed in the refractory floor about the reaction chamber 2. The gas divides and flows thru the two paths formed by the diametrically opposed inlet 25 and outlet pipe 29. The latter delivers the gas preferably into the annular volume about the reaction chamber. Here it mixes with the rest of the feed gas, including, or solely comprising, the gas which flowed thru annulus 9 and the mixture flows thru the circumferential slots into reaction chamber 2. The outlet for the processed gas is channel 6 in refractory 5.

The conductors 17 and 18 making electrical connection with auxiliary electrodes 23 and 24 respectively, are preferably enclosed in part by gas pipes 25 and 15. I preferably provide for a relatively small flow of gas thru pipe 15 outward which assists in cooling conductor 18. I may use refractory electrically insulating porcelain members to insulate the electrodes 23 and 24 and the conductors 17 and 18 from the heat withstanding refractory but certain combinations of refractory materials are themselves sufficiently good electrical insulation to suffice for the purpose of preventing any substantial flow of current between the two electrodes and between either of them and grounded portions of the supports for my reaction chamber.

Having now described one embodiment of my electrostatic means for arc control it will be obvious to those acquainted with the art that if I connect terminal conductors 17 and 18 to a source of potential the path of the electrons and the positively charged ions in the arc will be displaced from the paths which they would assume in the absence of the field. This corresponds to an oscillation of the position of the arc about the average path shown as dot 26 in Fig. 7. A certain effect is doubtless achieved when relatively low potential differences are employed but I preferably apply voltage differentials between electrode 23 and 24 of the order of from 50 to 200 volts per centimeter of distance measured between them. I may employ alternating current potentials of from 25 cycles per second to relatively high frequency. Other factors equal I find the higher the frequency at least up to a few hundred cycles per second the more effective my means for causing the arc to oscillate insofar as the conversion of gas is concerned. It will be understood that the velocity of motion of the electrons and ions in the arc is high, having due regard to the velocity of the gas which is being heated and that accordingly the distribution of heat tends to be the more effective the higher the frequency of the alternating potential applied to the auxiliary electrodes. I may of course employ 25 or 60 cycle power services to establish the potential difference for electrodes 23 and 24 or if I wish to utilize higher frequency potentials I may employ mechanical generators of known type or I may employ electron tube circuits of known properties to establish and maintain the desired frequency of alternations.

It will be understood that there are many variations of the particular means which I have described and depicted in Figs. 7*a* and 7*b*, which may be entirely suited to my purpose of establishing an electrostatic field in the vicinity of the arc in order to influence its position. I am in no wise limited to the means shown in detail in Fig. 7 in order to carry out my invention, but may employ many other means within the scope of my invention.

Having now described my process of controlled positioning and controlled oscillation of electric arcs applied to the conversion of gases, what I claim and desire to secure by Letters Patent is:

1. The process of subjecting a gas and solid particles suspended therein to the action of an electric arc which comprises the steps of passing the gas into a gas confining chamber continuously at a regulated rate, maintaining at least one electric arc in said chamber, adding solid particles of predetermined size at a regulated rate to suspend said particles discretely in said gas, imparting differing velocities to said gas and to said particles to force a substantial fraction of the total number of said particles to repeatedly traverse at least a part of the locus of said arc, influencing the form of the locus of said arc by imposing a regulated magnetic field on the magnetic field due to the arc itself, and removing the gas phase and solids from the chamber.

2. The process of subjecting a gas phase and solid particles suspended therein to the action of an electric arc which comprises maintaining at least one electric arc in operation in a gas confining chamber, adjusting the form of said arc by imposing a regulated auxiliary magnetic field on the magnetic field due to the arc alone, feeding said gas phase continuously at a regulated rate into said chamber, adding solid particles of predetermined size at a regulated rate to suspend said particles discretely in said gas phase, channeling the flow of the mixed phases to establish a centrifugal field of force whereby a substantial number of the suspended particles repeatedly traverse at least part of the locus of said electric arc while the gas stream passes forward and away from the locus of said arc without substantial recycling thereto, and removing the treated gas phase and solid particles not retained in circulation in said chamber.

3. The process of subjecting a gas to the action of an electric arc which comprises the steps of continuously feeding the gas at a regulated rate into the chamber at a velocity to produce vortical flow in said chamber, introducing solid particles of predetermined size at a regulated rate into said vortex whereby a substantial proportion of said particles centrifugate, congregate discretely and circulate in suspension about the axis of the vortex in an outer zone thereof, maintaining a substantial portion of at least one electric arc in at least a portion of said outer zone, influencing the form of the said arc by regulating an interacting auxiliary magnetic field, repeatedly passing a substantial number of said circulating particles through said electric arc, and continuously removing from said chamber the gas phase and solid particles not retained in said vortex.

4. The process of subjecting a gas phase and solid particles suspended therein to the action of an electric arc which comprises feeding the gas continuously at a regulated rate into a gas retaining chamber with axial outlet, feeding solid particles of predetermined size and at regulated rate into said chamber to suspend said particles in said gas, channeling the flow of the mixed phases to establish opposing centrifugal and gas frictional forces on each particle to substantially increase the concentration of the particles in the suspension in a zone removed from the walls of the chamber, maintaining at least one electric arc in the midst of the zone of particle concentration by prior disposition of the electrodes and coincident adjustment of an auxiliary magnetic field in the near vicinity of the magnetic field due to the said arc and removing from the chamber the products of interaction of gas phase and solid phase and particles not retained in the zone of concentration.

5. The process of claim 1 in which the gaseous phase which is treated is substantially composed of hydrocarbons.

6. The process of claim 1 in which the subdivided solid phase is refractory substance.

7. The process of claim 1 in which the subdivided solid phase is substantially composed of a material selected from the group which consists of coke, charcoal, anthracite coal, and bituminous coal.

References Cited in the file of this patent

UNITED STATES PATENTS

| | | |
|---|---|---|
| 772,862 | Birkeland | Oct. 18, 1904 |
| 905,572 | Petersson | Dec. 1, 1908 |
| 1,018,990 | Rothe | Feb. 27, 1912 |
| 1,028,516 | Wielgolaski et al. | June 4, 1912 |
| 1,035,723 | Naville et al. | Aug. 13, 1912 |
| 1,063,760 | Zenneck et al. | June 3, 1913 |
| 1,443,091 | Petersen | Jan. 23, 1923 |
| 1,634,311 | Thomas | July 5, 1927 |
| 1,902,384 | Steinbuch et al. | Mar. 21, 1933 |
| 2,165,820 | Smyers | July 11, 1939 |